(12) United States Patent
Satake et al.

(10) Patent No.: US 9,698,680 B2
(45) Date of Patent: Jul. 4, 2017

(54) SWITCHING POWER DEVICE

(71) Applicant: DENSO CORPORATION, Kariya, Aichi-pref. (JP)

(72) Inventors: Hiroyuki Satake, Ogaki (JP); Yoshihiro Kizaki, Kasugai (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/852,705

(22) Filed: Sep. 14, 2015

(65) Prior Publication Data
US 2016/0087526 A1    Mar. 24, 2016

(30) Foreign Application Priority Data
Sep. 22, 2014 (JP) ................. 2014-192500

(51) Int. Cl.
*H02M 3/156* (2006.01)
*H02M 1/36* (2007.01)

(52) U.S. Cl.
CPC ............. *H02M 3/156* (2013.01); *H02M 1/36* (2013.01)

(58) Field of Classification Search
CPC .......... H02M 1/32; H02M 1/36; H02M 3/155; H02M 3/156; H02M 2003/155; H02M 2003/156
See application file for complete search history.

(56) References Cited

U.S. PATENT DOCUMENTS

| 7,002,330 B2 * | 2/2006 | Kitani | H02M 1/36 323/222 |
| 7,839,130 B2 * | 11/2010 | Shimizu | H02M 1/32 323/282 |

(Continued)

FOREIGN PATENT DOCUMENTS

| JP | H6-225523 | 8/1994 |
| JP | 2006-325339 | 11/2006 |

(Continued)

OTHER PUBLICATIONS

U.S. Appl. No. 14/666,718, filed Mar. 24, 2015, Yoshida, (corresponding to JP 2014-78624).

(Continued)

*Primary Examiner* — Matthew Nguyen
(74) *Attorney, Agent, or Firm* — Posz Law Group, PLC

(57) ABSTRACT

A switching power device includes: a main circuit having a switching element and a coil that adjusts a current flowing through the coil and outputs a voltage; an output voltage detection circuit that outputs a first voltage; an error amplification circuit that outputs an error signal in response to a difference between the first voltage of the output voltage detection circuit and a second voltage; an oscillation circuit that outputs an oscillation signal; a driving circuit that outputs the driving signal to the switching element in response to a comparison result by comparing the oscillation signal of the oscillation circuit and the error signal of the error amplification circuit; and a soft-start control unit that controls the second voltage in response to the first voltage of the output voltage detection circuit when the first voltage reaches a soft-start threshold voltage between a standard detection voltage and a start detection voltage.

7 Claims, 12 Drawing Sheets

(56) References Cited

U.S. PATENT DOCUMENTS

| | | | |
|---|---|---|---|
| 7,843,146 B2 * | 11/2010 | Chang Chien | H05B 33/0848 |
| | | | 315/224 |
| 2007/0290667 A1 | 12/2007 | Nagai et al. | |
| 2008/0136341 A1 | 6/2008 | Araki et al. | |
| 2008/0238395 A1 | 10/2008 | Hasegawa | |
| 2011/0181262 A1 | 7/2011 | Deguchi | |
| 2012/0049829 A1 * | 3/2012 | Murakami | H02M 1/32 |
| | | | 323/288 |

FOREIGN PATENT DOCUMENTS

| | | |
|---|---|---|
| JP | 2011-166851 | 8/2011 |
| JP | 2011-254126 | 12/2011 |

OTHER PUBLICATIONS

U.S. Appl. No. 14/713,279, filed May 15, 2015, Kamei, (corresponding to JP 2014-137600).
U.S. Appl. No. 14/813,701, filed Jul. 30, 2015, Okuda et al., (corresponding to JP 2014-159447).
U.S. Appl. No. 14/711,825, filed May 14, 2015, Iwasaki et al., (corresponding to JP 2014-102308).

* cited by examiner

FIG. 7A

| IN VOL Vin | OUT VOL Vout | V1 | RST | RSTA1 | RSTA2 |
|---|---|---|---|---|---|
| VH1 | VA | Vt1→Vt0 | 0 | L | L |
| VH1 | VB | Vt2→Vt1 | 0 | L | L |
| VH1 | VC | Vt3→Vt2 | 0 | L | L |
| VH1 | VD | 0 →Vt3 | 0 | L | L |
| VH2 | VA | Vt1→Vt0 | 1 | L | L |
| VH2 | VB | Vt2→Vt1 | 1 | L | L |
| VH2 | VC | Vt3→Vt2 | 1 | L | L |
| VH2 | VD | 0 →Vt3 | 1 | L | L |

FIG. 7B

| IN VOL Vin | OUT VOL Vout | V1 | RST | RSTA1 | RSTA2 |
|---|---|---|---|---|---|
| VH1 | VA | Vt1→Vt0 | 0 | L | L |
| VH1 | VB | Vt2→Vt1 | 1 | H | H |
| VH1 | VC | Vt3→Vt2 | 1 | L | H |
| VH1 | VD | 0 →Vt3 | 1 | L | L |
| VH2 | VA | Vt1→Vt0 | 1 | L | L |
| VH2 | VB | Vt2→Vt1 | 1 | L | L |
| VH2 | VC | Vt3→Vt2 | 1 | L | L |
| VH2 | VD | 0 →Vt3 | 1 | L | L |

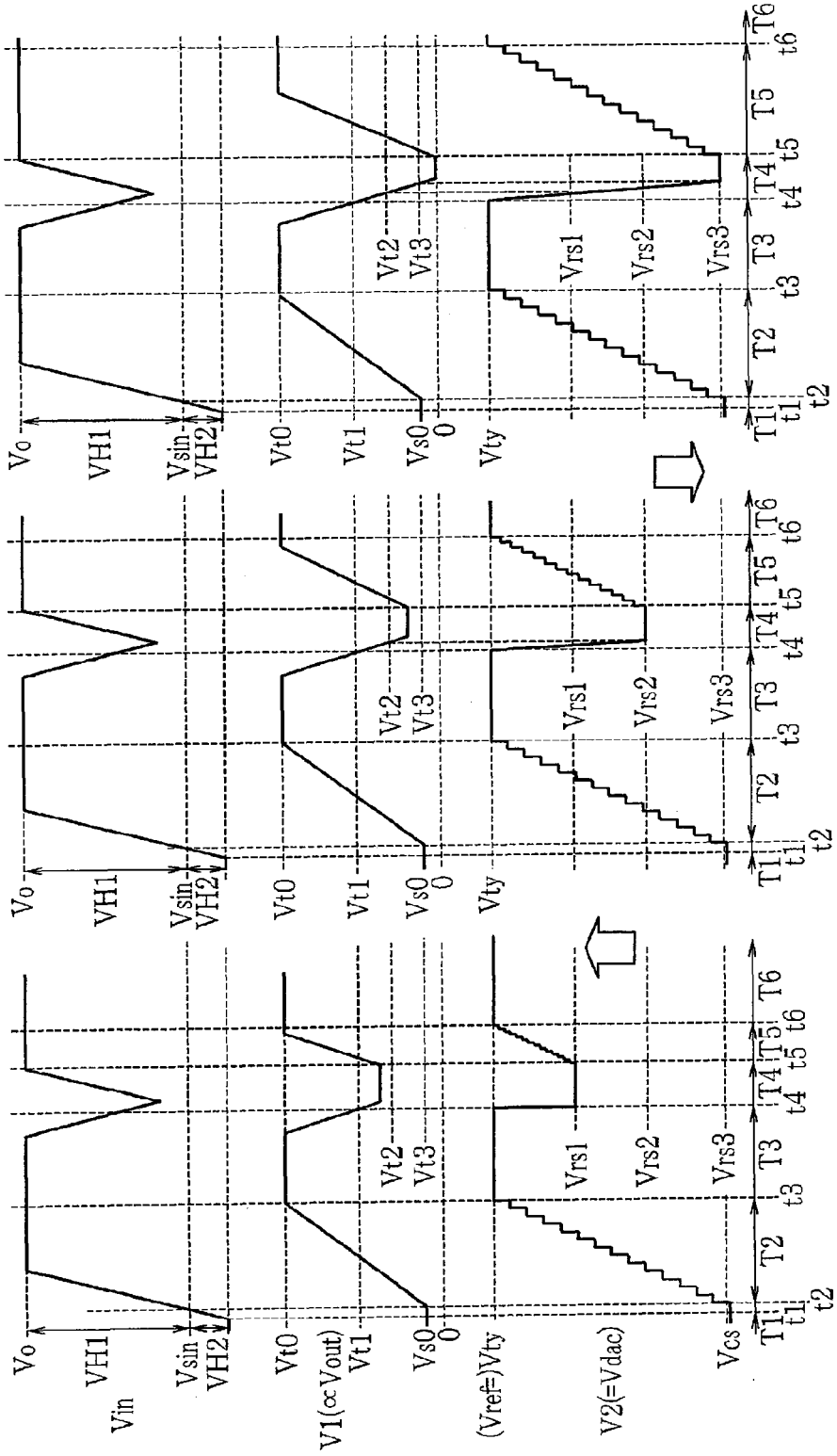

SWITCHING POWER DEVICE

CROSS REFERENCE TO RELATED APPLICATIONS

This application is based on Japanese Patent Applications No. 2014-192500 filed on Sep. 22, 2014, the disclosure of which is incorporated herein by reference.

TECHNICAL FIELD

The present disclosure relates to a switching power device.

BACKGROUND

A soft-start circuit is occasionally included in this type of switching power device. The soft-start circuit is arranged for preventing a large rush current from flowing into a switching element (for example, see Patent Document 1). According to the technology described in the Patent Document 1, a soft-start is carried out in response to an input terminal voltage. Thus, it is possible to prevent a rush current from damaging a switching element.

Since the technology disclosed in the Patent Document 1 reads only an input terminal voltage, the technology effectively operates at the time of activating the input terminal voltage. However, the technology disclosed in the Patent Document 1 cannot be applied to the situation where the output terminal voltage suddenly drops in response to some events after the activation of the input terminal voltage and to the situation where the output terminal voltage drops as the input terminal voltage is not affected by the events.

Additionally, the technology disclosed in Patent Document 2 activates a soft-start circuit with reference to an output voltage, and inhibits an overshoot at the time of activating a power source. In other words, the technology in the Patent Document 2 discloses an invention for inhibiting an overshoot at the time of activating a power source. Even when this type of soft-start circuit is applied to the situation when the output terminal voltage suddenly drops from a reference voltage and returns to a restoration voltage, it may not be applicable in view of the properties of discharging voltage from a capacitor in, for example, a soft-start circuit.

[Patent Document 1] JP 2006-325339 A
[Patent Document 2] JP H06-225523 A

SUMMARY

It is an object of the present disclosure to provide a switching power device so as to inhibit an overshoot when the output terminal voltage suddenly drops from a reference voltage and returns to a restoration voltage.

A switching power device according to an aspect of the present disclosure includes: a main circuit that includes a switching element and a coil, and adjusts a current flowing through the coil and outputs a voltage in response to a driving signal; an output voltage detection circuit that outputs a first voltage corresponding to the voltage outputted from the main circuit; an error amplification circuit that outputs an error signal in response to a difference between the first voltage of the output voltage detection circuit and a second voltage corresponding to a control target voltage of the main circuit; an oscillation circuit that outputs an oscillation signal; a driving circuit that outputs the driving signal to the switching element in response to a comparison result obtained by comparing the oscillation signal of the oscillation circuit and the error signal of the error amplification circuit; and a soft-start control unit that controls the second voltage, which is provided to the error amplification circuit, to be a restart voltage between a control standard voltage, which corresponds to a target output voltage of the main circuit, and a control start voltage of the main circuit in response to the first voltage of the output voltage detection circuit when the first voltage of the output voltage detection circuit reaches a soft-start threshold voltage between a standard detection voltage and a start detection voltage.

Accordingly, since the soft-start control unit controls the second voltage, which is provided to the error amplification circuit, to be the restart voltage between the control standard voltage corresponding to the target output voltage of the main circuit and the control start voltage of the main circuit in response to the first voltage of the output voltage detection circuit, a soft-start can be carried out so that an overshoot can be inhibited when the output terminal voltage suddenly drops from the standard output voltage as the target output voltage and then returns to the restoration voltage.

BRIEF DESCRIPTION OF THE DRAWINGS

The above and other objects, features and advantages of the present disclosure will become more apparent from the following detailed description made with reference to the accompanying drawings. In the drawings:

FIGS. 7A and 7B are graphs that show characteristic charts schematically illustrating the relationship between an input signal and an output signal of a logic circuit;

FIGS. 8A through 8C are graphs that show timing charts schematically illustrating the flow of a soft-start control process when the output voltage changes;

DETAILED DESCRIPTION

The following describes several embodiments about a switching power device with reference to drawings. It is noted that a switching power device 1 described in the following section illustrates a mode of a positive power circuit for controlling an output voltage Vout from 0V before activation to a positive predetermined voltage after activation; however, the embodiment is applicable to a negative power circuit for controlling the output voltage Vout from 0V before activation to a negative predetermined voltage after activation.

(First Embodiment)

Figure 1:
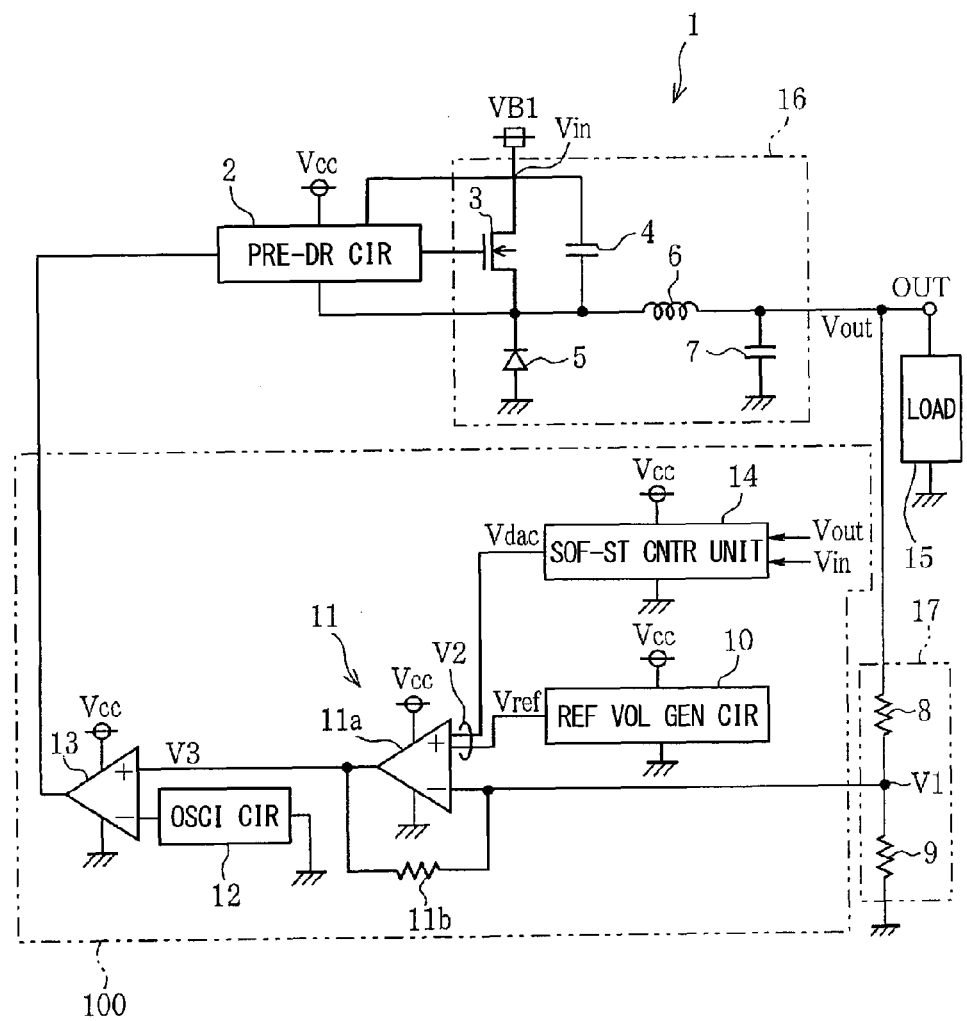
FIG. 1 is a diagram that shows an electrical configuration of a switching power device schematically.

FIG. 1 shows an example of the configuration of a switching power device 1. The switching power device 1 is a step-down type configuration and is configured to connect a pre-drive circuit 2 as a driving circuit, a MOS transistor 3 for output as a switching element, a boot-strap capacitor 4, a reflux diode 5, a coil 6, a capacitor 7, resistors 8 and 9, a reference voltage generating circuit 10, an error amplification circuit 11, an oscillation circuit 12, a comparator 13 and a soft-start control unit 14.

The switching power device 1 has an output terminal to which a load 15 is connected. Herein, the reference voltage generating circuit 10, the error amplification circuit 11, the oscillation circuit 12, the comparator 13 and the soft-start control unit 14 constitute a control unit 100 of the switching power device 1.

The MOS transistor 3 is configured as a main-drive switching circuit through, for example, an n-channel type MOSFET. However, the switching circuit may be configured by a p-channel type MOSFET, or may be configured by other kinds of transistor such as a bipolar transistor. A battery voltage VB1 or the like as an input voltage Vin is provided to the drain of the MOS transistor 3, and the reflux diode 5 is connected between the source of the MOS transistor 3 and a ground. In addition, the pre-drive circuit 2 is connected to the gate of the MOS transistor 3. The pre-drive circuit 2 sends a driving signal to the part between the gate and the source of the MOS transistor 3 in response to a control signal provided from a preceding circuit (i.e., the comparator 13) of the pre-drive circuit 2.

The boot-strap capacitor 4 is connected between the MOS transistor 3 and the pre-drive circuit 2 so that it is possible to perform quick charging. The coil 6 is connected between the source of the MOS transistor 3 and the output terminal OUT. The capacitor 7 is connected between the output terminal OUT and the ground. When the pre-drive circuit 2 controls the MOS transistor 3 to turn on, a current flows into the coil 6 through the source of the MOS transistor 3 and charges the capacitor 7, and the output voltage Vout rises. Subsequently, when the pre-drive circuit 2 controls the MOS transistor 3 to turn off, in order to maintain the flowing current in the coil 6, the current flows in a reflux loop composed by the coil 6, the reflux diode 5 and the load 15 and the output voltage Vout lowers when the power held in the capacitor 7 is discharged.

Voltage dividing resistors 8, 9 are connected between the output terminal OUT and the ground. The voltage dividing resistors 8, 9 divide the output voltage Vout and output the voltage V1 to the inverting input terminal of an op-amp 11a. The error amplification circuit 11 includes the op-amp 11a and a feedback resistor 11b connected between the inverting input terminal and the output terminal of the op-amp 11a.

The reference voltage generating circuit 10 and the soft-start control unit 14 are connected to the non-inverting input terminal of the op-amp 11a. The reference voltage generating circuit 10 is configured by, for example, a band-gap reference circuit to generate a reference voltage Vref with high precision, and outputs the reference voltage Vref to the non-inverting input terminal of the op-amp 11a in the error amplification circuit 11.

Figure 4:
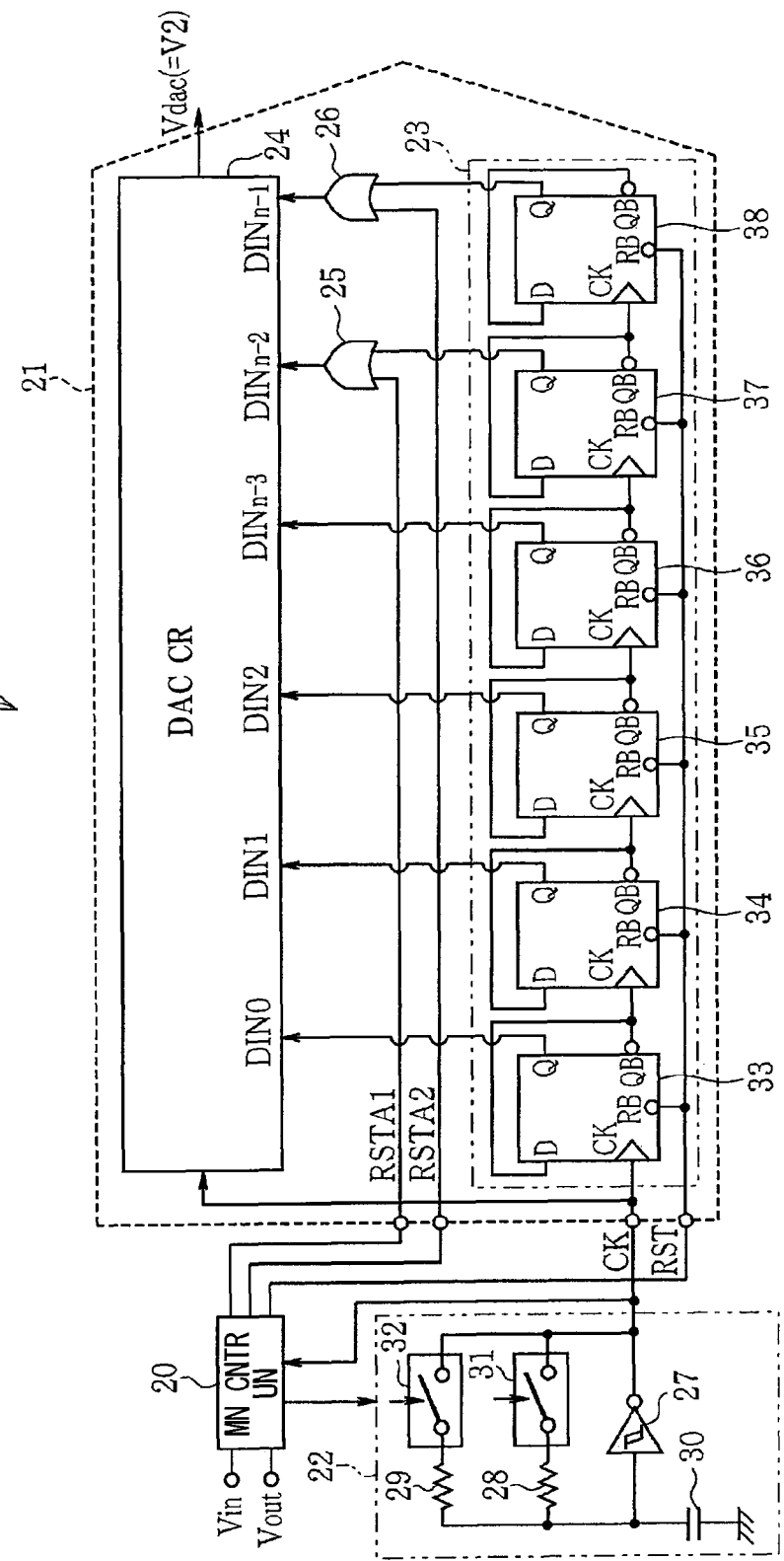
FIG. 4 is a diagram that shows an electrical configuration schematically illustrating a soft-start control unit.

The soft-start control unit 14 uses a D/A converter 21 illustrated in FIG. 4 to output a D/A output control voltage Vdac. The error amplification circuit 11 amplifies the difference between the dividing voltage V1 obtained from the output voltage Vout through the resistors 8, 9, and either the output reference voltage Vref of the reference voltage generating circuit 10 or the D/A output control voltage Vdac of the soft-start control unit 14 and then outputs the result.

Figure 3:
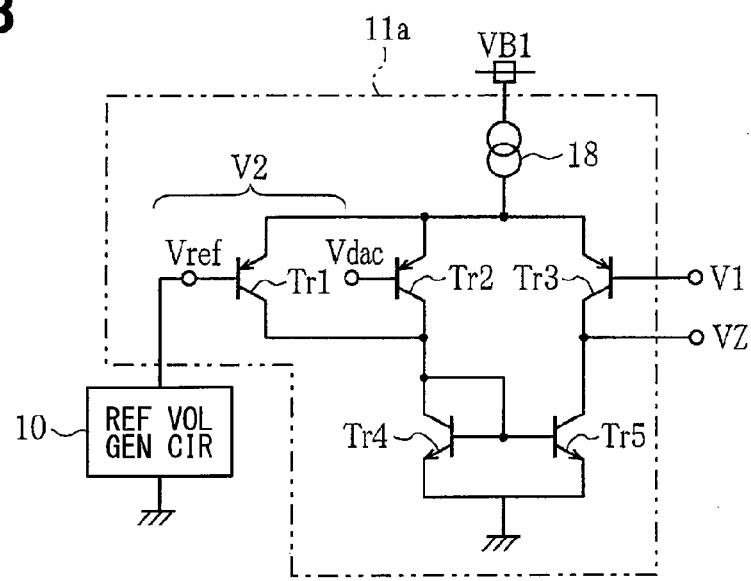
FIG. 3 is a diagram that shows an electrical configuration schematically illustrating an example of the configuration of an input stage in the error amplification circuit.

FIG. 3 illustrates an example of the configuration of an input stage of the op-amp 11a in the error amplification circuit 11. It is noted that the op-amp 11a ordinarily constitutes, for example, an amplification stage and an output stage, however, the drawings of these stages are omitted. The op-amp 11a includes a current source 18, pnp-type transistors Tr1 through Tr3, and npn-type transistors Tr4 and Tr5. The pnp-type transistors Tr1 through Tr3 are connected in parallel and constitute differential pairs. The npn-type transistors Tr4 and Tr5 are connected as a current mirror to form an active load in response to the differential pairs. The reference voltage Vref outputted from the reference voltage generating circuit 10 is applied to the base of the pnp-type transistor Tr1, and the D/A output control voltage Vdac of the soft-start control unit 14 is applied to the base of the pnp-type transistor Tr2. In addition, the dividing voltage V1 obtained by dividing the output voltage Vout is applied to the base of the pnp-type transistor Tr3.

Since the pnp-type transistors Tr1 through Tr3 are connected in parallel, when the control voltage Vdac is lower than the reference voltage Vref, the current from the current source 18 largely flows through the pnp-type transistor Tr2; and when the control voltage Vdac is larger than the reference voltage Vref, the current provided from the current source 18 becomes smaller through the pnp-type transistor Tr1.

In a case where the control voltage Vdac is less than the reference voltage Vref, when the voltage V1 (i.e., the base voltage of the pnp-type transistor Tr3) drops by ΔV, the collector current of the pnp-type transistor Tr3 increases in response to ΔV, the output voltage of the active load Tr5 increases in response to the increment portion of the collector current. In this situation, the input stage of the op-amp 11a outputs the amplified voltage Vz as a result of the amplification of the difference between the control voltage Vdac and the voltage V1. In contrary, when the control voltage Vdac is larger than the reference voltage Vref, the input stage of the op-amp 11a output the voltage Vz as a result of the amplification of the difference between the reference Vref and the voltage V1. The error amplification circuit 11 amplifies the output voltage Vz of the input stage of the op-amp 11a through the amplification stage and the output stage, and outputs to the comparator 13 as the voltage V3. It is noted that the op-amp 11a is configured by using the pnp-type transistors Tr1 through Tr3 and the npn-type transistors Tr4 and Tr5; however, p-channel type MOS transistors and n-channel type MOS transistors may be used in replace of the pnp-type transistors and the npn-type transistors.

The voltage V3 outputted from the error amplification circuit 11 is provided to the non-inverting input terminal of the comparator 13. The oscillation circuit 12 is connected to the inverting input terminal of the comparator 13. The comparator 13 outputs an oscillation signal that changes in a predetermined cycle formed in, for example, a triangular waveform or a saw-tooth waveform. The comparator 13 outputs a comparison result obtained by comparing the output signal of the error amplification circuit 11 and the oscillation signal of the oscillation circuit 12. It is noted that the MOS transistor 3, the reflux diode 5, the coil 6, the capacitor 7 constitutes a main circuit 16, and the resistors 8, 9 constitutes an output voltage detecting circuit 17.

Figure 2:
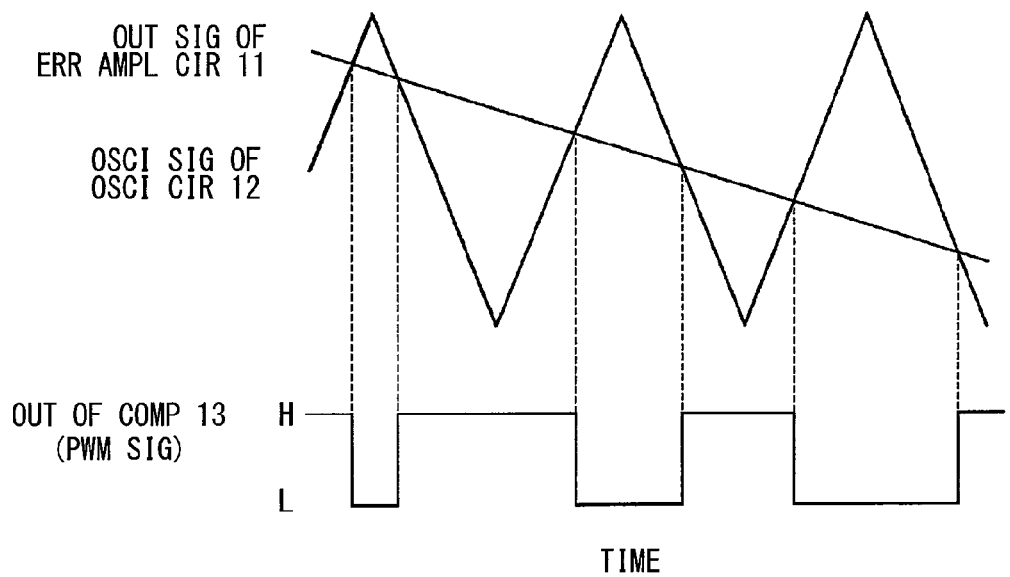
FIG. 2 is a graph that shows a waveform chart illustrating the relationship among an output signal of an error amplification circuit, an oscillation signal of an oscillation circuit, and an output of a comparator.

FIG. 2 schematically shows a comparison result obtained by comparing the output signal of the error amplification circuit 11 and the oscillation signal of the oscillation circuit 12. As shown in FIG. 2, when the output signal of the error amplification circuit 11 is higher than the oscillation signal of the oscillation circuit 12, the comparator 13 outputs an "H"-level signal; and when the output signal of the error amplification circuit 11 is lower than the oscillation signal of the oscillation circuit 12, the comparator 13 outputs an "L"-level signal. Accordingly, when the voltage V3 outputted from the error amplification circuit 11 is lower, the comparator 13 outputs, for example, a PWM signal with higher proportion of "L"-level. In contrary, when the voltage V3 outputted from the error amplification circuit 11 is higher, the comparator 13 outputs, for example, a PWM signal with higher proportion of "H"-level. The PWM signal is provided to the pre-drive circuit 2.

The pre-drive circuit 2 applies a voltage larger than a threshold voltage between the gate and source of the MOS transistor 3 when the PWM signal sent from the comparator 13 is at the "H"-level; and the pre-drive circuit 2 applies a voltage (i.e., 0 volt) smaller than the threshold voltage between the gate and source of the MOS transistor 3 when the PWM signal is at the "L"-level. Therefore, the pre-drive circuit 2 control the MOS transistor 3 to turn on or off in response to the PWM signal. The duty ratio of the PWM signal changes in response to the magnitude of the voltage V3 outputted from the error amplification circuit 11 so that the output voltage Vout is controlled so as to conform to the target output voltage.

The following describes an example of configuration of the soft-start control unit 14 as the main feature in the present embodiment. As illustrated in the configuration example of the soft-start control unit 14 in FIG. 4, the soft-start control unit 14 includes a main control unit 20, a D/A converter 21 and an oscillation unit 22. The D/A converter 21 includes a counter 23, a DAC core 24, OR gates 25, 26. The voltage outputted from the DAC core 24 is configured as the output control voltage Vdac, and is outputted to the error amplification circuit 11.

The oscillation unit 22 is configured such that resistors 28, 29 are connected to the input and output of an inverter 27, and is configured by a self-oscillator connecting a capacitor 30, which is connected between the input of the inverter 27 and the ground.

The resistors 28, 29 connected between the input and output terminals of the inverter 27 are connected in parallel. The resistance values of the resistors 28, 29 are set to be different to each other, and switches 31, 32 for selecting the resistor 28 or the resistor 29 are respectively connected to the resistors 28, 29. The switches 31, 32 enable the main control unit 20 to perform on/off control. Accordingly, the oscillation frequency of the oscillation unit 22 can be controlled by the main control unit 20, and the oscillation unit 22 outputs an oscillation signal, whose frequency is controlled by the main control unit 20, as a clock signal CK to the counter 23 in the D/A converter 21 after power activation.

The counter 23 is configured by connecting a plurality (i.e., n-stages) of DFFs 33 through 38 in a cascade form. The DFFs 33 through 38 are configured such that the inputs D are connected to the inverting outputs QB. Each of the DFFs 33 through 38 configures the QB output at the pre-stage circuit as a clock input and maintains the output Q and the inverting output QB at the QB output timing.

The DFF 33 as the $1^{st}$ stage performs inversion at the output timing of the clock signal CK, and the DFFs 34 through 38 as the $k_{th}$ (n≥k≥2) stage perform inversion at the output timing of the DFFs 33 through 37 as the $(k-1)_{th}$ stage. The counter 23 adds 1 when the clock signal CK at "1" is inputted. The DAC core 24 converts k-bit digital data of the counter 23 as an analog signal and outputs the signal as a D/A output control voltage Vdac at the input timing in which an input clock signal CK is inputted.

Figure 5:
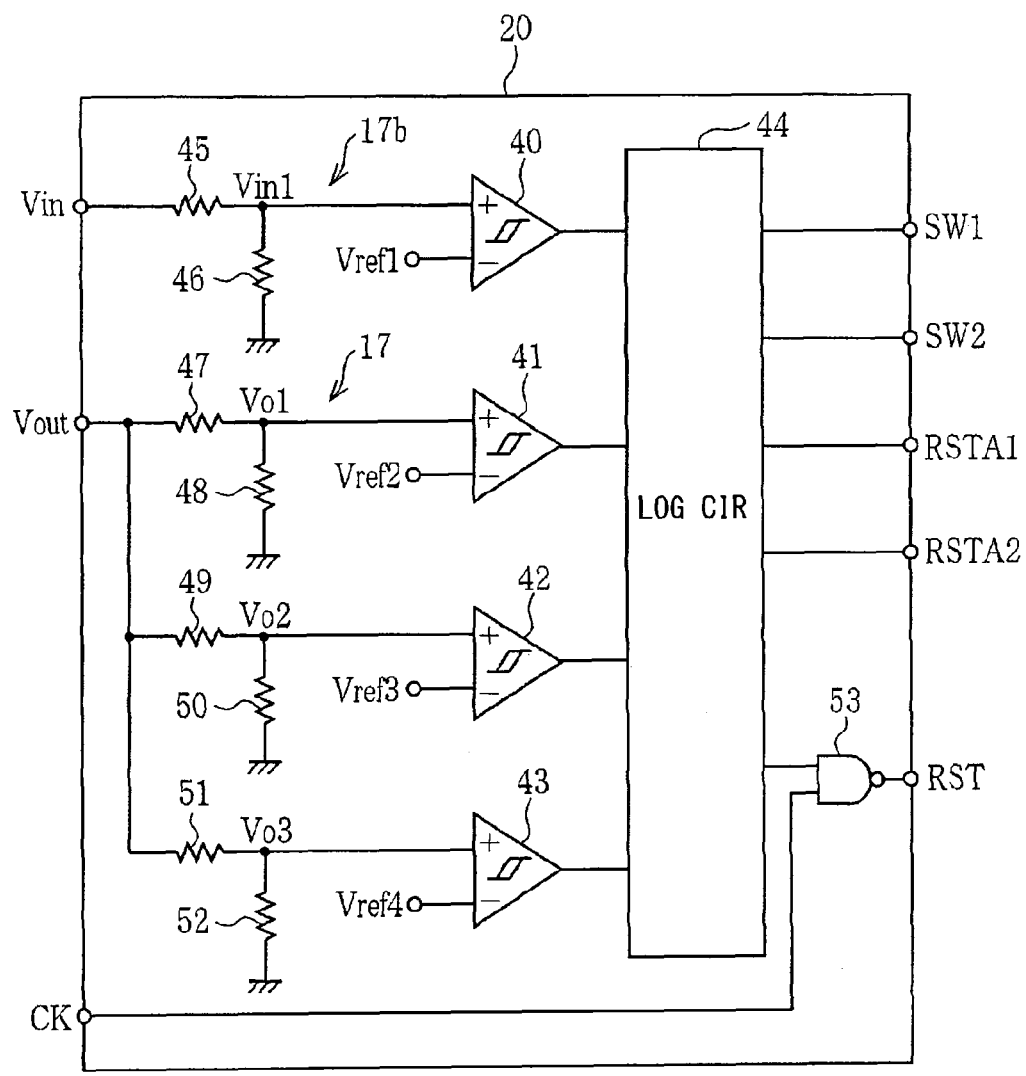
FIG. 5 is a diagram that shows an electrical configuration schematically illustrating a main control unit.

The main control unit 20 is configured by, for example, the control logic as shown in FIG. 5, and the main control unit 20 inputs an input voltage Vin, an output voltage Vout, and a clock signal CK and outputs control signals SW1 and SW2 sent from the switches 31, 32, restart signals RSTA1, RSTA2, and a reset signal RST based on the input signal.

Inside the soft-start control unit 14 according to the present embodiment, the OR gates 26, 25 are respectively connected to digital input terminals DINn-1, DINn-2 at the upper two-bits on an MSB side of the DAC core 24. The OR gate 26 inputs the output Q of the DFF 38 corresponding to MSB and the restart signal RSTA 2 inputted from the main control unit 20, and outputs the result of the logical operation to the digital input terminal DINn-1 as the MSB of the DAC core 24.

The OR gate 25 inputs the output Q of the DFF 37 corresponding to the MSB-1 bit and the restart signal RSTA1 inputted from the main control unit 20, and outputs the result of the logical operation to the digital input terminal DINn-2 corresponding to the MSB-1 bit of the DAC core 24.

When the OR gate 26 inputs the restart signal RSTA2 at an active level "1" (i.e., "H" in the present embodiment), the OR gate 26 compulsorily outputs the signal at the active level "1" (i.e., "H" in the present embodiment) to the digital input terminal DINn-1 of the DAC core 24.

When the OR gate 25 inputs the restart signal RSTA1 at the active level "1," the OR gate 25 compulsorily outputs the signal at the active level "1" to the digital input terminal DINn-2 of the DAC core 24. Therefore, the main control unit 20 controls the restart signals RSTA1, RSTA2 to enable the output voltage Vdac of the DAC core 24 to be controlled step by step instantaneously.

In addition, the main control unit 20 outputs the reset signal RST to the reset terminal of each of the DFFs 33 through 38 in the counter 23. When the reset signal RST is at the active level, the counter 23 resets itself and restarts the counting from zero.

According to the present embodiment, the main control unit 20 switches the restart signals RSTA1, RSTA2 as the active level "1" or the inactive level "0" and outputs the reset signal RST at the active level "1" to the counter 23 so as to control the count value of the counter 23 to be inputted to the DAC core 24 and controls the D/A output control voltage Vdac to be at 0 volts, a quarter, an half, and three quarters of the maximum limiting voltage of the voltage Vdac step by step instantly FIG. 5 illustrates an example of circuit configuration of the main control unit 20 schematically. The main control unit 20 is configured by using, for example, hysteresis-type comparators 40 through 43, a logic circuit 44, resistors 45 through 52, and a NAND gate 53, and becomes a module to input the input voltage Vin, the output voltage Vout and the clock signal CK and output the reset signal RST to the counter 23 based on these input signals to reset the counter 23 and controls the oscillation frequency of the oscillation unit 22 by controlling the switches 31 and 32 to turn on or off inside the oscillation unit 22.

The input voltage detection circuit 17b detects a dividing voltage Vin1 obtained by dividing the input voltage Vin through the resistors 45 and 46. The output voltage detection circuit 17 detects the dividing voltages Vo1 through Vo3 obtained by dividing the output voltage Vout through the resistors 47 through 52. The comparators 40 through 43 inside the main control unit 20 have hysteresis input/output characteristic respectively. Thus, when the input voltage Vin or the output voltage Vout rises and drops, the output result at the time of rising and the output result at the time of dropping are made different to each other. Accordingly, the output level (i.e., SW1, SW2, RSTA1, RSTA2) of the logic circuit 44 can be altered as illustrated in the after-mentioned FIG. 7 at the time when the input voltage Vin or the output voltage Vout rises and drops.

The hysteresis-type comparator 40 compares a detection voltage of the input voltage detection circuit 17b with the reference voltage Vref1, and outputs the comparison result to the logic circuit 44. The hysteresis-type comparators 41 through 43 compare a detection voltage of the output voltage detection circuit 17 with reference voltages Vref2 through Vref4 respectively, and output the comparison results to the logic circuit 44. Herein, the reference voltages Vref2 through Vref4 are set in the relation of Vref2>Vref3>Vref4.

Figure 6:
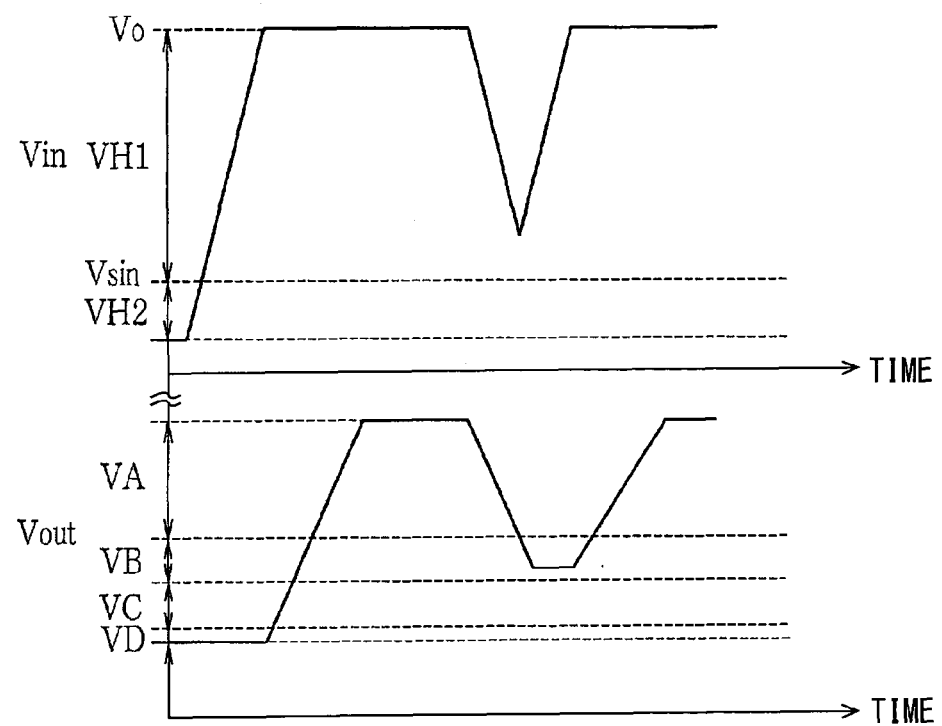
FIG. 6 is a graph that shows a timing chart schematically illustrating the relationship between the waveform of an input voltage and the waveform of an output voltage.

FIG. 6 illustrates the mode of changes in the input voltage Vin and the output voltage Vout. As shown in FIG. 6, when the input voltage Vin rises from a low potential, the output voltage Vout rises behind the rising change in the input voltage Vin. In contrary, when the input voltage Vin drops from a predetermined potential, the output voltage Vout drops behind the dropping change in the input voltage Vin.

The logic circuit 44 inside the main control unit 20 outputs the reset signal RST, and the restart signals RSTA1, RSTA2 as shown in FIGS. 7A and 7B in response to the relationship between the input voltage Vin and the voltage V1 (i.e., the output voltage Vout). For example, FIG. 7A shows an example of the output logic level of the logic circuit 44 when the input voltage Vin or the output voltage Vout rises, and FIG. 7B shows an example of the output logic level of the logic circuit 44 when the input voltage Vin or the output voltage Vout drops. With regard to the reset signal RST in FIGS. 7A and 7B, "1" represents the active level, and "0" represents the inactive level. The restart signals RSTA1 and RSTA2 are at "H"-level.

The logic circuit 44 determines whether the output voltage V1 of the output voltage detection circuit 17 exists in either a plurality of ranges divided step by step in order to change the reset signal RST, the restart signal RSTA1, RSTA2 at the active level in response to the result of the logical operation, and outputs these signals as the control signals to the counter 23 or the OR gates 25, 26. The main control unit 20 controls to change the recounting value of the counter 23 to be inputted to the DAC core 24 in response to the result of the logical operation of the logic circuit 44 so as to generate restart voltages Vrs1, Vrs2, Vrs3 of the output control voltage Vdac through the DAC core 24.

The process in the soft-start control unit 14 at the time of power activation and at the time of having a short-break in power supply is described with reference to FIGS. 8A through 8C. FIGS. 8A through 8C show three types of modes that illustrate: the moment when the output voltage Vout rises from the start voltage (∞ start detection voltage Vs0) at the time of an input voltage being applied, up to the standard control voltage (∞ standard detection voltage Vt0) at the time in which the output voltage is controlled normally; and the moment when the output voltage Vout suddenly drops from the standard control voltage. In addition, FIGS. 8A through 8C schematically illustrate the relationship among the input voltage Vin, the output voltage V1 (=the dividing voltage V1 at the node between the resistors 8, 9∝ the output voltage Vout) of the output voltage detection circuit 17, and the input voltage V2 applied to the non-inverting input terminal of the op-amp 11a in the error amplification circuit 11.

First, the battery voltage VB1 is inputted in response to, for example, engine activation, the input voltage Vin rises based on the battery voltage VB1 during T1 period after the time t1 in FIGS. 8A through 8C. At this time, an operational source voltage Vcc is provided to each of the circuits. At the time of activation, the main control unit 20 controls an output of the clock signal CK at a prescribed frequency from the oscillation unit. In this timing, since the output voltage Vout is outputted as zero volts, the output voltage detection circuit 17 detects a start detection voltage VS0 (≈0 V) as the voltage V1 obtained by dividing the output voltage Vout through the resistors.

At the time t1, the input voltage Vin is lower than the start threshold voltage Vsin. Subsequently, during the time in which the input voltage Vin has not reached the start threshold voltage Vsin and the input voltage Vin is in the voltage range VH2, the main control unit 20 in the soft-start control unit 14 continues to output the active level "1" as the reset signal RST through the logic circuit as shown in FIG. 7A so as to continue resetting the output of the counter 23. In other words, the output voltage Vout is controlled not to rise.

The counter 23 is in an idle state by maintaining the counting value as 0 (i.e., T1 period in FIGS. 8A through 8C). As the main control unit 20 of the soft-start control unit 14 outputs the reset signal RST to the counter 23, the soft-start control unit 14 configures the counting value of the counter 23 as an initial value (=0) and controls the DAC core 24 to output the control start voltage Vcs (=0V) as the D/A output control voltage Vdac.

When the input voltage Vin reaches the predetermined start threshold voltage Vsin, the logic circuit 44 releases the reset as the inactive level "0," and the main control unit 20 starts the original soft-start control at the time t2 in FIG. 8. At this time, the soft-start control unit 14 controls the oscillation unit 22 to input the clock signal CK to the counter 23 to increment the counting value of the counter 23 gradually from the initial value (=0) during the T2 period in FIG. 8 so that the voltage Vdac (=V2) reaches the control standard voltage Vty from the control start voltage Vcs.

Originally, the output voltage V2 (=Vdac) of the soft-start control unit 14 is the initial value (=0), the output of the error amplification circuit 11 (non-inverting input of the comparator 13) is lower than the output of the oscillation circuit 12 (the inverting of the comparator 13). Subsequently, the MOS transistor 3 is controlled to turn full-off (i.e., the duty ratio of a PWM signal=0%).

The output voltage V2 (=Vdac) of the soft-start control unit 14 rises with the lapse of time, the period during which the output of the error amplification circuit 11 (non-inverting input of the comparator 13) is above the output of the oscillation circuit 12 (the inverting input of the comparator 13) appears (see FIG. 2). As a result, the output of the comparator 13 is at the "H"-level. Since the oscillation circuit 12 outputs an oscillation signal in a triangular wave or the like as shown in FIG. 2 to the comparator 13, as the output of the error amplification circuit 11 is higher, the period during which the output of the comparator 13 is at the "H"-level becomes frequent in response to this situation so that the period during which the MOS transistor 3 is turned on becomes longer. In contrary, as the output of the error amplification circuit 11 is lower, the period during which the output of the comparator 13 is at the "L"-level becomes longer in response to this situation so that the period during which the MOS transistor 3 is turned off becomes longer.

Since the counter 23 controls the counting value to rise periodically in response to the clock input of the clock signal CK, the control target voltage V2 as the output voltage Vdac of the DAC core 24 rises step by step periodically. Thus, the output voltage Vout and the voltage V1 also gradually rise to follow the control target voltage V2. During this time, the dividing voltage V1 obtained through the resistors 8, 9 gradually rises from the start detection voltage Vs0 to the standard detection voltage Vt0 during the T2 period in FIG. 8.

It is noted that when the voltage Vdac is lower than the output reference voltage Vref of the reference voltage generating circuit 10, the error amplification circuit 11 outputs the voltage reflecting the amplification of the error in response to the difference between the voltage Vdac and the voltage V1; in contrary, when the voltage Vdac is higher than the output reference voltage Vref of the reference voltage generating circuit 10, the error amplification circuit 11 outputs the voltage reflecting the amplification of the error in response to the difference between the output reference voltage Vref and the voltage V1 of the reference voltage generating circuit 10 (see the above-mentioned description of FIG. 3). Thus, when the output reference voltage Vref of the reference voltage generating circuit 10 is preliminarily set at, for example, the maximum limiting voltage of the voltage V1 or a voltage close to the maximum limiting voltage of the voltage V1, the control target voltage V2 is controlled to be at the reference voltage Vref corresponding to the control standard voltage Vty. Therefore, the switching power device 1 prevents an overshoot of the output voltage Vout as the control target voltage V2 gradually rises with the lapse of time from the time t2 right after activation to the time t3.

The present disclosure considers the situation where the output voltage Vout of the output terminal OUT drops in an instant in response to some events. For example, the present disclosure considers some events such as a rapid change in the impedance value of the load 15 connected to the output terminal OUT, or the output terminal OUT having contact with a foreign substance and short-circuited to the ground.

For example, the present disclosure considers the situation where the output voltage Vout of the output terminal OUT drops at the time t4 shown in FIG. 8 (see the voltage V1 in FIGS. 8A through 8C). As shown in FIG. 5, the main control unit 20 of the soft-start control unit 14 compares the dividing voltage Vin1 of the input voltage detection circuit 17b with the voltage Vref through the comparator 40, and compares the dividing voltages Vo1 through Vo3 of the output voltage detection circuit 17b with the voltages Vref1 through Vref3 through the comparators 41 through 43 respectively.

The comparison result in which the main control unit 20 uses the comparators 40 through 43 is described in reference to FIG. 8 describing the input voltage Vin and the voltage V1 proportional to the output voltage Vout as the base. The comparison result performed by the comparator 40 corresponds to the concept of determining whether the input voltage Vin exists in the input voltage range VH1 or the input voltage range VH2. In addition, the comparison processes performed by the comparators 41 through 43 correspond to the concept of comparing the voltage V1 corresponding to the output voltage Vout with the soft-start threshold voltages Vt1 through Vt3. The threshold voltages Vt1 through Vt3 are preliminarily set to correspond to the voltages Vref2 through Vref4 shown in FIG. 5, and these threshold voltages Vt1 through Vt3 are used as the soft-start threshold voltages as the determination threshold values to determine whether the output voltage Vout exists in either the output voltage range VA, VB, VC or VD shown in FIG. 6. Since the voltage V1 is proportional to the output voltage Vout, the following describes the situation of using the relationship between the voltage V1 and the soft-start threshold voltages Vt1 through Vt3.

In a constant state, the output reference voltage Vref (=control standard voltage Vty) of the reference output generating circuit 10 corresponds to the control target voltage V2 during the T3 period shown in FIG. 8. Alternatively, it may be in the situation that the control target voltage V2 at this time is larger than the output reference voltage Vref of the reference voltage generating circuit 10. At this time, the input voltage Vin is in the voltage range VH1, and the voltage V1 is nearly stable at the standard detection voltage Vt0 so that the output voltage Vout is within the voltage range VA shown in FIG. 6. The logic circuit 44 outputs the inactive level "0" as the reset signal RST and outputs the "L"-level to the OR gates 26, 25 as the signals RSTA1, RSTA2 as shown in FIGS. 7A and 7B. At this time, the DAC core 24 outputs the control target voltage V2 in response to the output of the counter 23.

Subsequently, as the output voltage Vout drops, the voltage V1 also drops when a fault happens. At this time, when the voltage V1 is less than or equal to the soft-start threshold voltage Vt1 (i.e., the output voltage Vout is lower than or at the border between the voltage ranges VA and VB), the soft-start control unit 14 controls the changing of the output of the counter 23 to be inputted to the DAC core 24 so as to lower the output voltage Vdac so that the voltage V2 is set at the restart voltage Vrs1, Vrs2 and Vrs3 step by step (see the time t4 shown in FIGS. 8A through 8C). The restart voltages Vrs1 through Vrs3 are set in relation of Vrs1>Vrs2>Vrs3 in the present embodiment.

For example, as shown in FIG. 8A, when the input voltage Vin in the voltage range VH1 even if the output voltage Vout drops from the voltage range VA to the voltage range VB and when the voltage V1 is in the range from the soft-start threshold voltage Vt1 to Vt2, only the comparator 41 among the comparators 41 through 43 outputs the "L"-level, and the comparators 42, 43 output the "H"-level together. At this time, as shown in FIG. 7B, the logic circuit 44 outputs the active level "1" as the reset signal RST in a pulse-shape form, and outputs the "H"-level as the signals RSTA1, RSTA2 to the OR gates 26, 25.

As a result, although the counting result of the counter 23 is once reset, the output the "H"-level from the OR gates 26, 25 are inputted to the input of the upper two-bits of the DAC core 24. Accordingly, the DAC core 24 outputs approximately three quarters of the reference voltage Vref (≈control standard voltage Vty) as the restart voltage Vrs1 for the output voltage Vdac of the DAC core 24. Subsequently, even when the counter 23 performs counting again, since the input of the upper 2-bits of the DAC core 24 as the "H"-level, the output Q of the DFFs 37, 38 corresponding to the upper 2-bits of the counter is made ineffective, only the lower bits of the DAC core 24 are made effective so as to start counting. Accordingly, the DAC core 24 controls the output voltage Vdac to rise gradually in reference to the restart voltage Vrs1 (see the T5 period in FIG. 8A). When the DAC core 24 controls the output voltage Vdac up to the control standard voltage Vty, the control target voltage V2 is stabilized at the reference voltage Vref (see the T6 period in FIG. 8A).

Additionally, for example, as shown in FIG. 8B, when the input voltage Vin in the voltage range VH1 even if the output voltage Vout drops and when the voltage V1 is in the range of the soft-start threshold voltage Vt2 to Vt3, the comparators 41, 42 among the comparators 41 through 43 outputs the "L"-level, and the comparator 43 outputs the "H"-level. At this time, as shown in FIG. 7B, the logic circuit 44 outputs the active level "1" as the reset signal RST in a pulse-shape form, and outputs the "H"-level as the signal RSTA1 to the OR gate 26.

As a result, although the counting result of the counter 23 is once reset, the output "H" from the OR gates 26 is inputted to the input of the upper 1-bit of the DAC core 24. Accordingly, the DAC core 24 outputs approximately one-half of the reference voltage Vref (=control standard voltage Vty) as the restart voltage Vrs2 for the output voltage Vdac of the DAC core 24. Subsequently, even if the counter 23 performs counting again, since the input of the upper 1-bit of the DAC core 24 as "H," the output Q of the DFF 38 corresponding to the upper 1-bit of the counter is made ineffective, only the lower bits of the DAC core 24 are made effective so as to start counting. Accordingly, the DAC core 24 controls the output voltage Vdac to rise gradually in reference to the restart voltage Vrs2 (see the T5 period in Hg. 8B). When the DAC core 24 controls the output voltage Vdac up to the control standard voltage Vty, the control target voltage V2 is stabilized at the reference voltage (see the T6 period in FIG. 8B).

Moreover, as shown in FIG. 8C, when the input voltage Vin in the voltage range VH1 even if the output voltage Vout drops and when the voltage V1 is in the range from the soft-start threshold voltage Vt3 to Vt4, that is, the output voltage Vout is in the range VD, the comparators 41 through 43 output the "L"-level altogether. At this time, as shown in FIG. 7, the logic circuit 44 outputs the active level "1" as the reset signal RST in a pulse-shape form, and outputs the "L"-level as the signals RSTA1, RSTA2 to the OR gates 26, 25.

As a result, since the counting result of the counter 23 is once reset and the "L"-level is inputted to the OR gates 26, 25, the counting result of the counter 23 is inputted to all input bits of the DAC core 24. Accordingly, the DAC core 24 outputs the control start voltage Vcs (for example, ≈0V) as the restart voltage Vrs3 for the output voltage Vdac of the DAC core 24. Subsequently, even when the counter 23 restarts counting, all bits are made effective by the DFFs 33 through 38 of the counter 23 and are inputted to the DAC core 24.

Accordingly, the DAC core 24 controls the output voltage Vdac to rise gradually in reference to the control start voltage Vcs as the restart voltage Vrs3 (see the T5 period in FIG. 8C). Subsequently, when the DAC core 24 controls the output voltage Vdac to rise up to the control standard voltage Vty, the control target voltage V2 is stabilized at the reference voltage Vref (see the T6 period in FIG. 8C).

Figure 9:
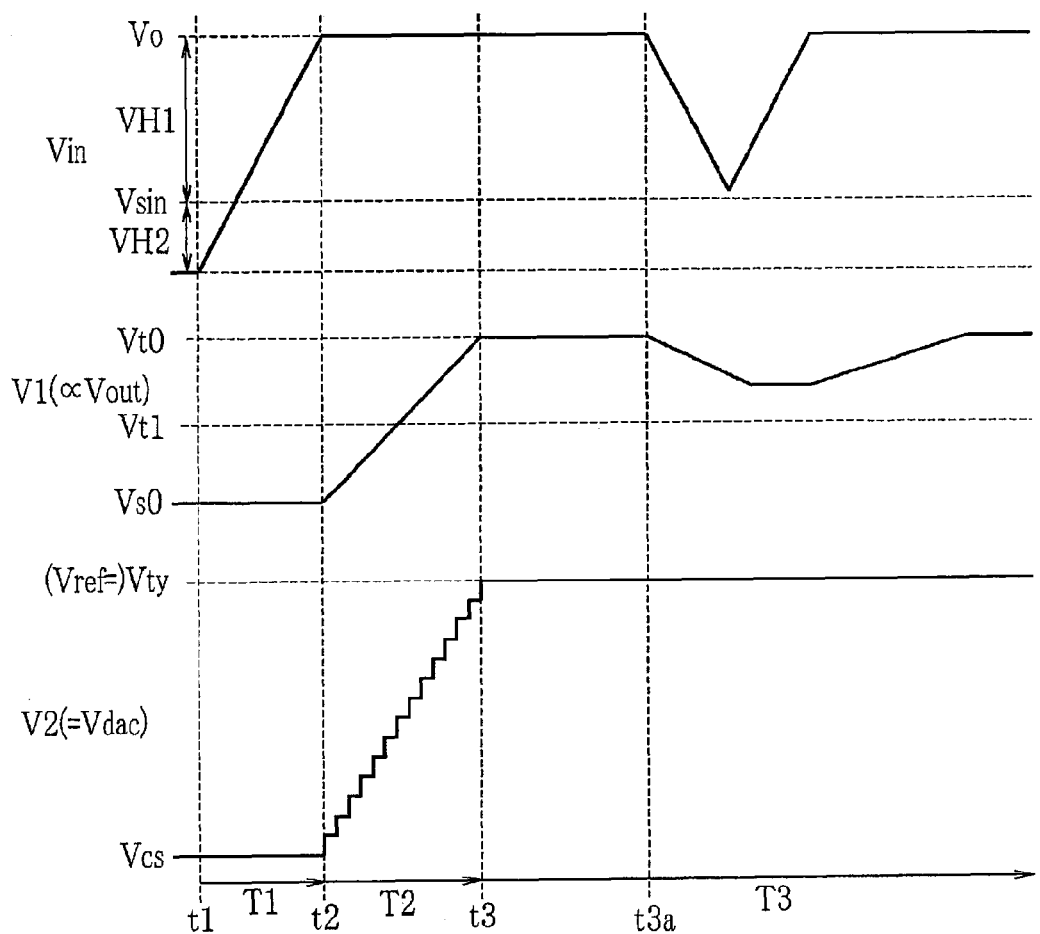
FIG. 9 is a graph that is a timing chart schematically illustrating the flow of a control process when the output voltage changes to a degree in which the output voltage does not reach a threshold value.

As shown in FIG. 9, even if the input voltage Vin drops at the time t3a, when the input voltage Vin is in the voltage range VH1 and when the voltage V1 does not reach the soft-start threshold voltage Vt1 or the voltage V1 does not fall below the voltage Vt1, the main control unit 20 maintains the output voltage Vdac of the DAC core 24 constantly as the maximum value (the reference voltage Vref≈the control standard voltage Vty) during the T3 period in FIG. 9. Therefore, the control target voltage V2 does not change. The forgoing control is carried out.

As described above, according to the present disclosure, the soft-start control unit 14 controls the output voltage Vdac (=V2) of the DAC core 24 in response to the output voltage V1 of the output voltage detection circuit 17 in a case where the output voltage V1 of the output voltage detection circuit 17 reaches the soft-start threshold voltages Vt1, Vt2 and Vt3, which are located between the standard detection voltage Vt0 and the start detection voltage Vs0.

At this time, when the soft-start control unit 14 controls the voltage V2 provided to the error amplification circuit 11 to be at the restart voltages Vrs1, Vrs2 and Vrs3 located between the control standard voltage Vty corresponding to the target output voltage of the main circuit 16 and the control start voltage Vcs of the main circuit 16, in response to the output voltage V1 of the output voltage detection circuit 17. Accordingly, the soft-start can be carried out even after the output voltage Vout drops so that a rush-in current can be inhibited and hence overshoot along with the rush-in current can be prevented. As a result, the fault such as the damage of elements can be prevented.

Since the soft-start control unit 14 controls the restart voltages Vrs1, Vrs2 and Vrs3 step by step, the time until the return of the output voltage Vout can be adjusted in comparison to the case where the restart voltage is not controlled step by step.

The soft-start control unit 14 includes the logic circuit 44 inside the main control unit 20 of the soft-start control unit 14, and the logic circuit 44 determines whether the dividing voltages Vo1 through Vo3 obtained by the output voltage Vout exist in the multiple voltage ranges VA, VB, VC or VD, which are divided step by step. The main control unit 20 controls to change the recount start value to be inputted to the DAC core 24 by using, for example, the OR gates 26, 25 in response to the result of the logic operation so that the restart voltages Vrs1, Vrs2 and Vrs3 of the control target voltage V2 (=Vdac) can be controlled through the DAC core 24. Accordingly, the soft-start can be performed after the output voltage Vout suddenly drops. Therefore, a rise in the rush-in current can be inhibited and hence the overshoot along with a rise in the rush-in current can be prevented.

In addition, the main control unit 20 uses, for example, the OR gates 26, 25 can set the recount start value of the DAC core 24 at a plurality of different values; therefore, the restart voltages Vrs1, Vrs2 and Vrs3 can be set at different values so that the restart voltages Vrs1, Vrs2 and Vrs3 can be set without using an analog circuit.

(Modification)

Figure 10A:
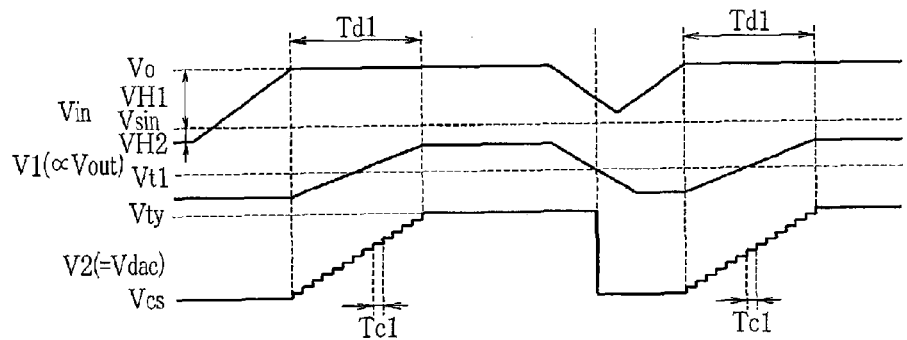
FIGS. 10A through 10C are graphs that show timing charts schematically illustrating the flow of controlling a step time at the time of performing a soft-start control.
Figure 10B:
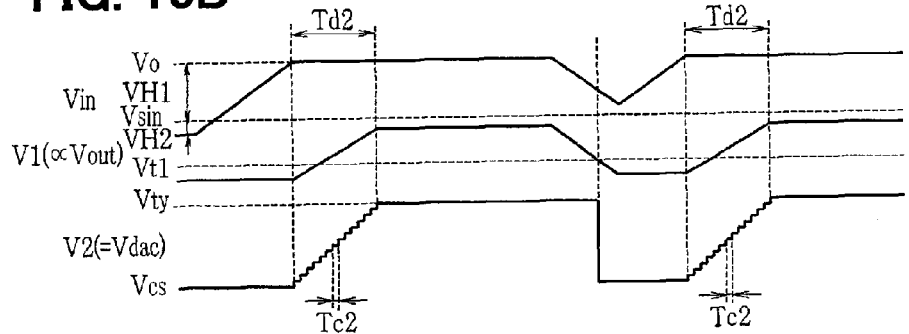
Figure 10C:
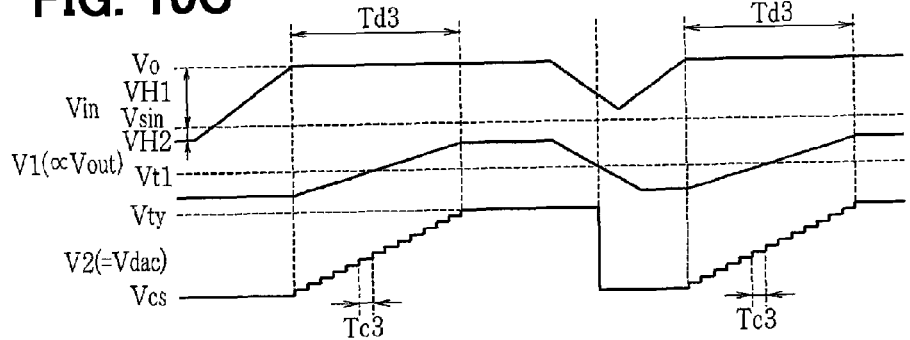

FIGS. 10A through 10C and FIG. 11 schematically illustrate a modification example. For example, the main control unit 20 illustrated in FIG. 4 controls the switches 31 and 32 inside the oscillation unit 22 to turn on or off so as to enable the change of the output frequency (i.e., cycle) of the clock signal CK. In other words, since the main control unit 20 adjusts the total resistance values of the resistors 28, 29 connected in parallel to the input and output terminals of the inverter 27 inside the oscillation unit 22 to enable the control of the oscillation frequency, the adjustment of the output cycle of the clock signal CK can be achieved. Consequently, the counting period of the counter 23 can be adjusted. When the counting-up period of the counter 23 shown in FIG. 10A is set as the standard count period Tc1, it takes only time Rd1 for raising the control target voltage V2 from the control start voltage Vcs to the control standard voltage Vty.

When the main control unit 20 adjusts the counting-up period of the counter 23 and shorten the counting-up period from the counting period Tc1 to the counting period Tc2, it only takes time Td2, which is shorter than the time Td1, for raising the control target voltage V2 from the control start voltage Vcs to the control standard voltage Vty. Therefore, raising the degree of an increase in the output voltage Vout can be achieved.

In contrary, when the main control unit 20 adjusts the counting-up period of the counter to make the counting-up period longer from the counting-period Tc1 to the counting-period Tc3, it takes only time Td3, which is longer than time Td1, for raising the control target voltage V2 from the control start voltage Vcs to the control standard voltage Vty. Therefore, lowering the degree of an increase in the output voltage Vout can be achieved.

According to the present modification example, since the main control unit 20 can vary the setting of the frequency (i.e., cycle) of the clock signal generated in the oscillation unit 22 by switching the switches 31, 32 to turn on or off through the control signals SW1 and SW2, the step time for raising the voltage V2 from the restart voltages Vrs1, Vrs2 and Vrs3 to the control standard voltage Vty can be controlled. Therefore, the degree of an increase in the voltage V2 can be adjusted.

Figure 11:
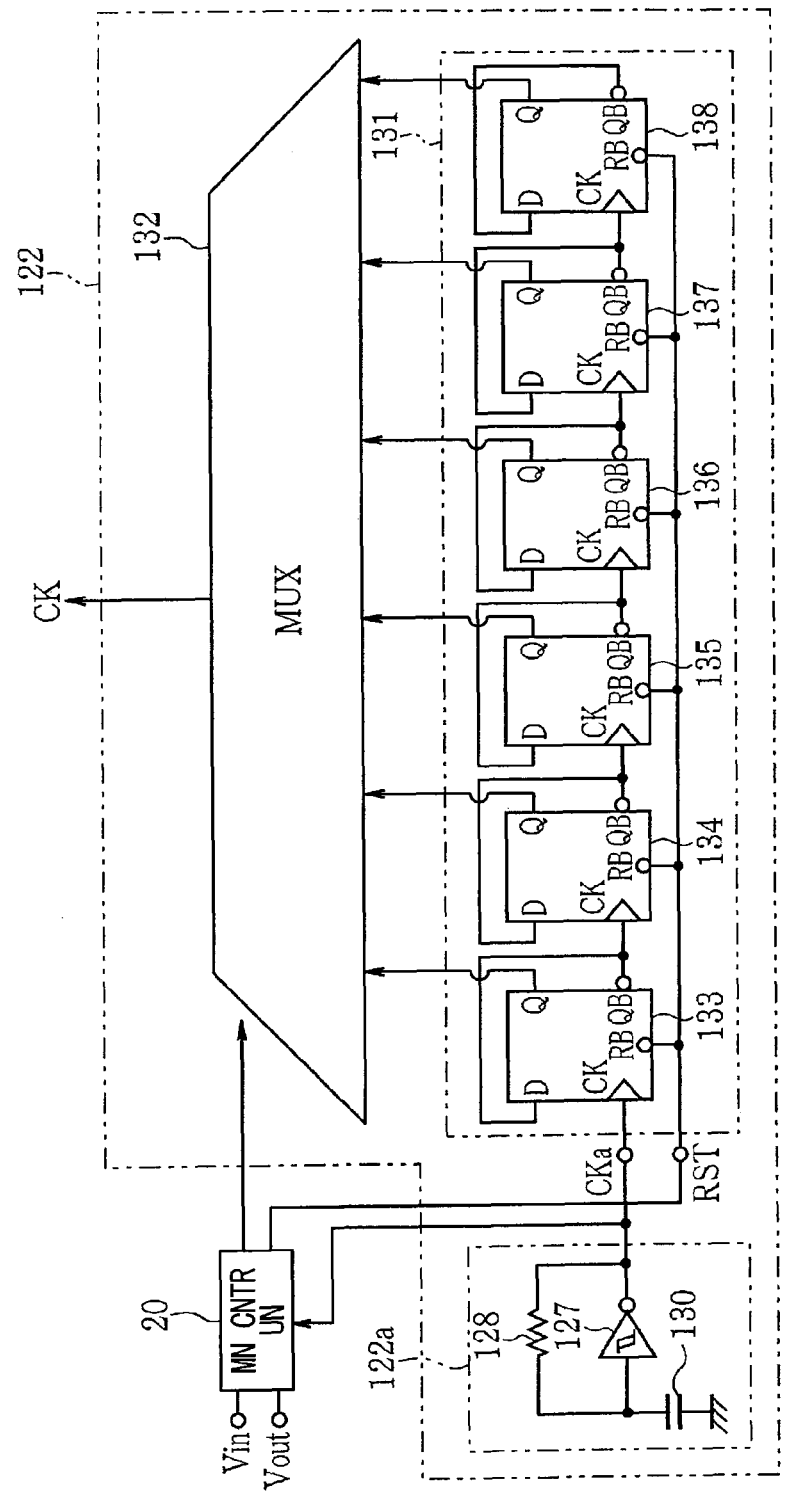
FIG. 11 is a diagram that shows an electrical configuration schematically illustrating one modification example of the schematic configuration of an oscillation unit.

FIG. 11 illustrates another mode of the oscillation unit. As shown in FIG. 11, the oscillation unit 22 is replaced by an oscillation unit 122, and the oscillation unit 122 includes: a main oscillator 122a; a frequency divider circuit 131 configured by connecting the QB terminals of the DFFs 133 through 137 to the clock signals CK of the next-stage DFFs 134 through 138 and connecting the QB terminal of each of the DFFs 133 through 138 to the input D in a feedback form; and a multiplexor 132 for outputting the selection of the output Q from any of the DFFs 133 through 138 as the clock signal CK to the counter 23 mentioned in the previous embodiment.

The main oscillator 122a outputs an oscillation signal fixed at a predetermined frequency as a clock signal CKa to the frequency divider circuit 131. The frequency divider circuit 131 frequency-divides the clock signal CKa and outputs a resulting clock, and enlarges the period of the clock signal CKa to 2 times, 4 times, 8 times, . . . and $2^{n-1}$ times, and then outputs the clocks to the multiplexor 132. The multiplexor 132 outputs the selection of one of these divided clock signals as the clock signal in response to the control signal of the main control unit 20. Therefore, the period of the clock signal CK can be adjusted. As a result, the degree of an increase in the output voltage Vout can be adjusted, the signal waveform at each node in this case is similar to the one illustrated in FIGS. 10A to 10C.

According to the modification example, since the multiplexor 132 outputs the selection of the signal subsequent to the frequency division performed by the frequency divider circuit 131, the counter 23 inputs the clock signal CK selected as the output of the multiplexor 132. Accordingly, the main control unit 20 can control the step time for raising the voltage V2 from the restart voltages Vrs1, Vrs2 and Vrs3 to the control standard voltage Vty. Therefore, the degree of an increase in the control target voltage V2 can be adjusted.

(Second Embodiment)

Figure 12:
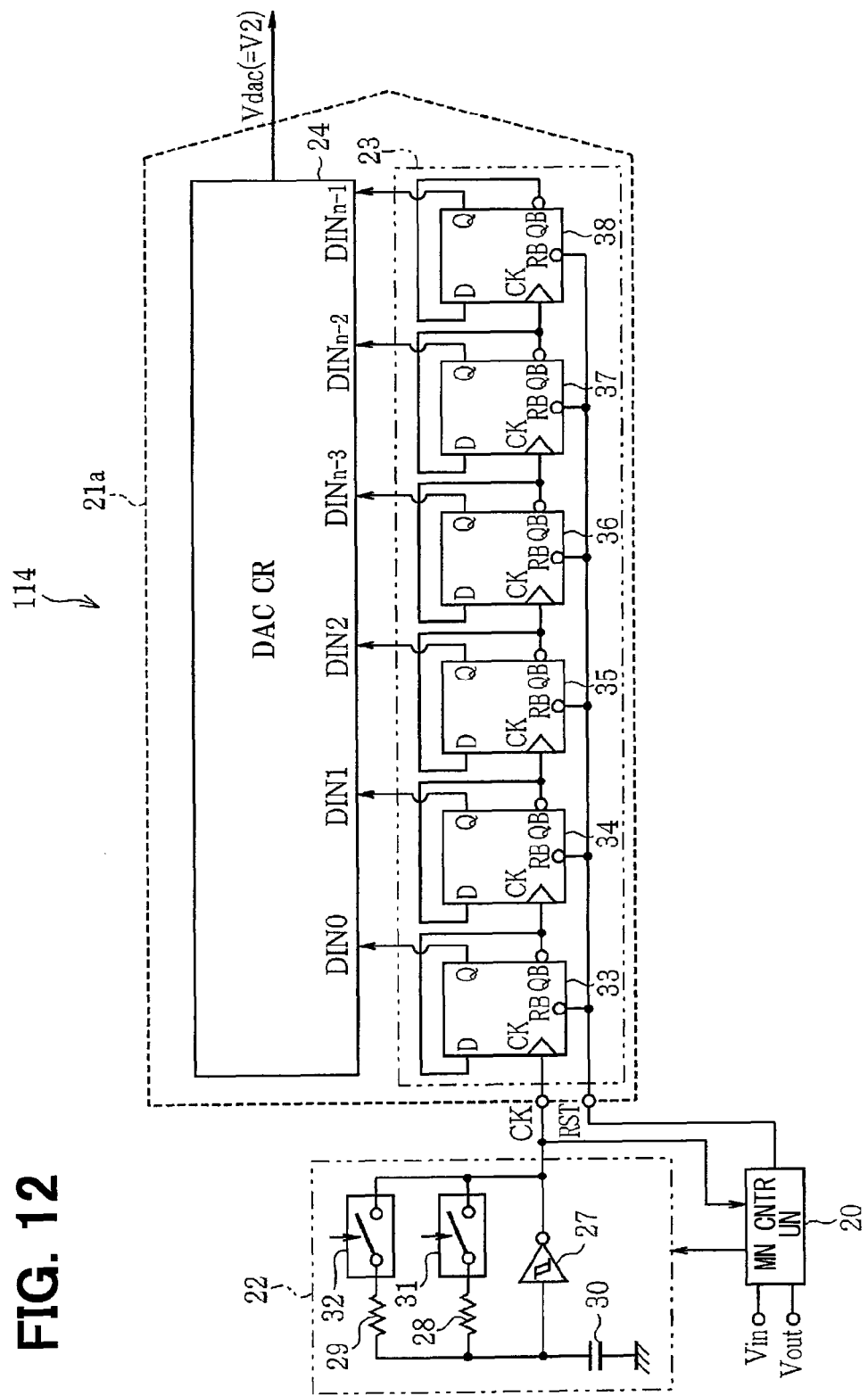
FIG. 12 is a diagram that shows an electrical configuration schematically illustrating a soft-start control unit according to a second embodiment.
Figure 13:
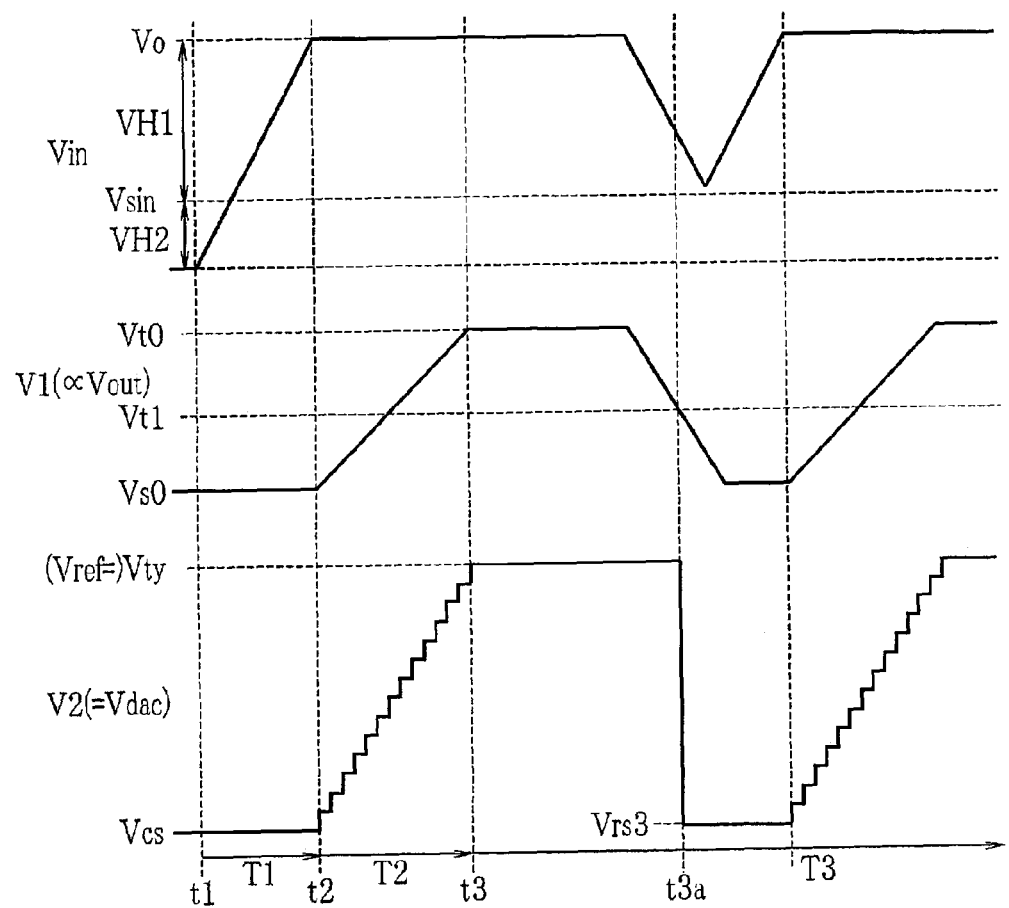
FIG. 13 is a diagram that shows a timing chart schematically illustrating the flow of a soft-start control process when the output voltage changes.

FIGS. 12 and 13 illustrate a second embodiment. A soft-start control unit 114 illustrated in FIG. 12 corresponds to the soft-start control unit 14 in FIG. 4 described in the first embodiment. The soft-start control unit 114 illustrated in FIG. 12 is different from the soft-start control unit 14 in that a D/A converter 21a without the configuration of the OR gates 26 and 25 is used in place of the D/A converter 21. In addition, the main control unit 20, which is shown in FIG. 12, outputs only the reset signal RST to the counter 23 without sending the restart signals RSTA1, RSTA2 to the D/A converter 21a.

According to the previous embodiment, when the output voltage Vout drops from a standard voltage (i.e., a standard target voltage), the main control unit 20 adjusts the restart voltage of the output voltage Vdac (=voltage V2) of the DAC core 24 to three steps as the voltages Vrs1, Vrs2 and Vrs3. However, in the present embodiment, the main control unit 20 adjusts the restart voltage of the output voltage Vout of the DAC core 24 to one step (for example, the voltage Vrs3 as the minimum voltage among the voltages Vrs1, Vrs2 and Vrs3 (=control start voltage Vcs). The operation effect similar to the one in the above-mentioned embodiment can be achieved.

(Other Embodiment)

The present disclosure is not limited to the previous embodiments; however, it can be modified or expanded as described in the following section.

The present disclosure may be applicable to any of a step-up type switching control device, a step-down type switching control device and a step-down/step-down switching control device. The present disclosure illustrates that the main control unit 20 generates the dividing voltages Vo1 through Vo3 through the output voltage detection circuit 17 by using the resistors 47 through 52 and compares the dividing voltages Vo1 through Vo3 with the voltages Vref2 through Vref4 respectively. However, the present disclosure may be applied to the embodiment in which the output voltage V1 of the output voltage detection circuit 17 obtained through the resistors 8 and 9 is inputted for making comparison with the corresponding voltages Vref1 through Vref3 respectively. The present disclosure shows that the dividing voltage obtained by dividing the output voltage Vout is detected as, for example, the first voltage V1; however, it may be detected as the voltage V1 that corresponds to the output voltage Vout.

The present disclosure shows that the OR gates 26, 25 inside the D/A converter 21 are connected to the digital input terminals DINn-1, DINn-2 corresponding to the upper two-bits of the DAC core 24, and the main control unit 20 outputs the restart signals RSTA1, RSTA2 to the OR gates 26, 25. The present disclosure may be applied to the situation in that the logic gates other than the OR gates 26, 25 are connected to the other digital input terminals DINn-3 through DIN0, and the main control unit 20 outputs signals corresponding to the restart signals RSTA1 and RSTA2 to the logic gates. Moreover, the present disclosure illustrates an example of using the OR gates 25, 26; however, other logic gates may also be used.

The rising-dropping relation with regard to the above-mentioned voltage may be reversed. In other words, the above-mentioned embodiment describes that the switching power device 1 controls the output voltage Vout to rise to a positive voltage corresponding to, for example, a first level, and lowers the output voltage Vout in a direction of, for example, a second level (i.e., 0 V) when a fault occurs. However, the present disclosure may be applied to the situation in that the switching power device 1 controls the output voltage Vout to drop at a negative voltage corresponding to, for example, a first level, and performs soft-start control at the time of raising the output voltage Vout in a direction of, for example, a second level (i.e., 0 V) when a fault occurs and at the time of lowering the output voltage Vout again.

The above embodiments describe that "less than or equal to" and "more than or equal to" are used for describing the boundary between two voltages. However, the control and process corresponding to "less than" and "more than" in place of "less than or equal to" and "more than or equal to" respectively are applicable.

The oscillation unit 22 is configured to control the oscillation frequency in response to the control signals SW1, SW2 of the main control unit 20; however, the main oscillator 122a which cannot control the oscillation frequency shown in FIG. 11 may be used as the "oscillation unit" in place of the oscillation unit 22.

The output voltage Vout can be stably restored by applying the above-mentioned embodiment when the output terminal OUT is grounded in response to some events and then a voltage is restored.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A switching power device comprising:
   a main circuit that includes a switching element and a coil, and adjusts a current flowing through the coil and outputs a voltage in response to a change in a driving signal;
   an output voltage detection circuit that outputs a first voltage corresponding to the voltage outputted from the main circuit;
   an error amplification circuit that outputs an error signal in response to a difference between the first voltage of the output voltage detection circuit and a second voltage corresponding to a control target voltage of the main circuit;
   an oscillation circuit that outputs an oscillation signal;
   a driving circuit that outputs the driving signal to the switching element in response to a comparison result obtained by comparing the oscillation signal of the oscillation circuit and the error signal of the error amplification circuit; and
   a soft-start control unit that sets the second voltage, which is provided to the error amplification circuit, to be at a restart voltage between a control standard voltage, which corresponds to a target output voltage of the main circuit, and a control start voltage of the main circuit in response to the first voltage of the output voltage detection circuit when the first voltage of the output voltage detection circuit drops at or below a soft-start threshold voltage between a standard detection voltage and a start detection voltage.

2. The switching power device according to claim 1, wherein the soft-start control unit controls the second voltage to be a restart voltage step by step.

3. The switching power device according to claim 1, further comprising:
   a reference voltage generating circuit that generates a reference voltage, which corresponds to the target output voltage of the main circuit during regular control, as the control standard voltage,
   wherein the soft-start control unit controls a step time during which the second voltage changes from the restart voltage to the reference voltage.

4. The switching power device according to claim 1, wherein the soft-start control unit includes:
   a logic circuit that determines whether the first voltage of the output voltage detection circuit exists in one of a plurality of ranges divided step by step;
   an oscillation unit that generates a clock signal;
   a counter that counts the clock signal of the oscillation unit;
   a DAC core that performs digital-to-analog conversion in response to a digital signal reflecting a counting result of the counter; and
   a main control unit,
   wherein the main control unit controls the counter to change a recounting start value inputted to the DAC core in response to a result of a logical operation performed by the logic circuit so as to generate the restart voltage of the second voltage through the DAC core.

5. The switching power device according to claim 4, wherein the main control unit of the soft-start control unit sets the recounting start value of the counter to one of a plurality of different values.

6. The switching power device according to claim 4, wherein the main control unit of the soft-start control unit sets a change in a frequency of the clock signal generated by the oscillation unit.

7. The switching power device according to claim 4, wherein the oscillation unit includes:
   a main oscillator that generates the clock signal; and
   a frequency divider circuit that divides the frequency of the clock signal of the main oscillator,
   wherein the counter counts a frequency-divided clock signal generated by the frequency divider circuit.

* * * * *